INVENTOR
GREGORY J. BURROWS

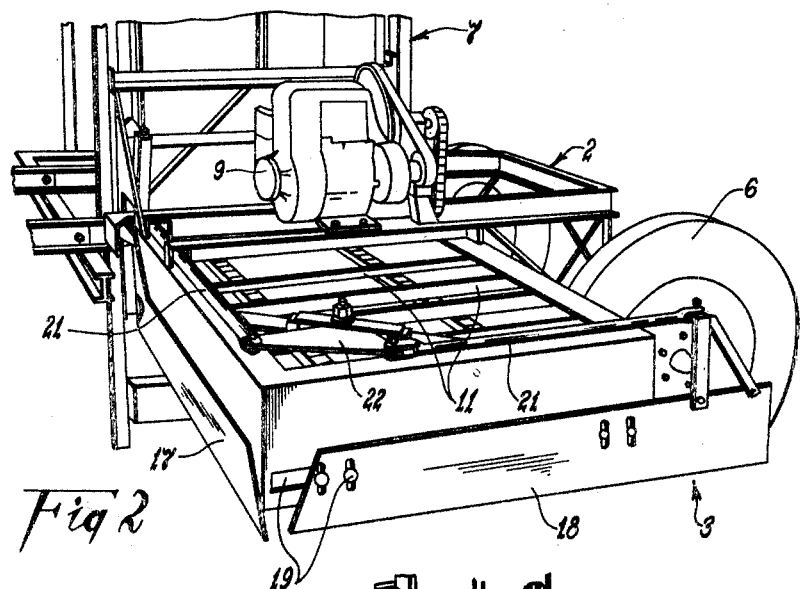
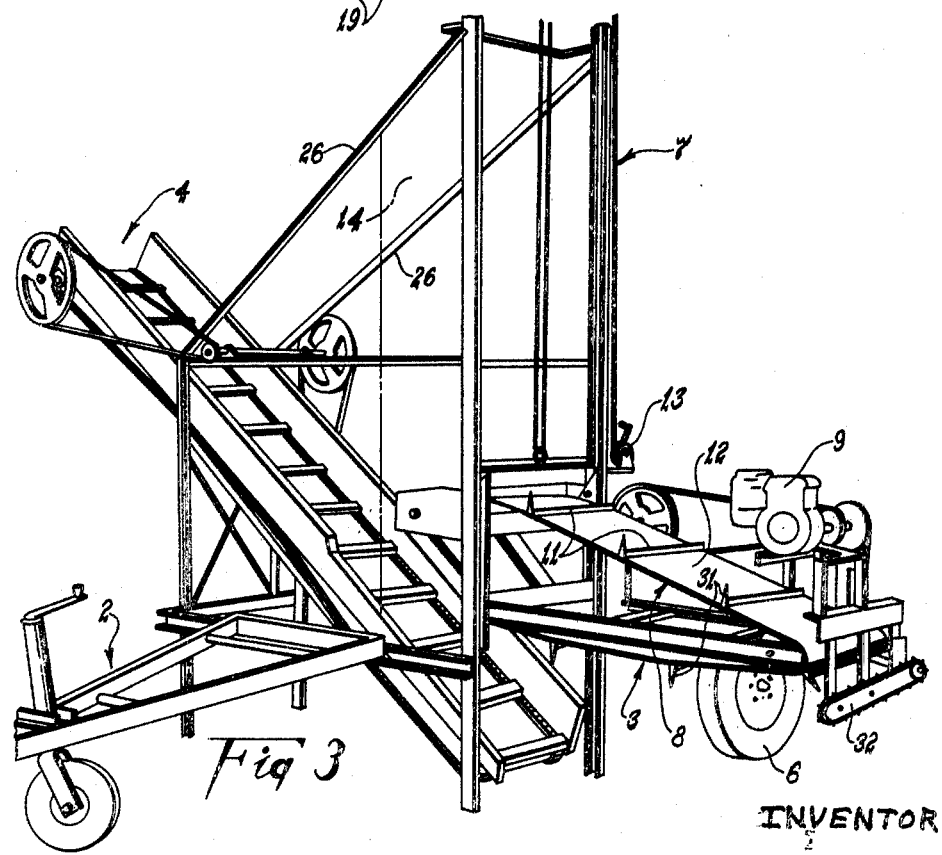

United States Patent Office 3,477,488
Patented Nov. 11, 1969

3,477,488
APPARATUS FOR CUTTING AND DELIVERING SILAGE FROM STACKS
Gregory John Burrows, Weebar Road, Drouin, Victoria, Australia
Filed May 22, 1967, Ser. No. 640,128
Int. Cl. A01f 17/02, 29/00
U.S. Cl. 146—70                      9 Claims

ABSTRACT OF THE DISCLOSURE

Apparatus for cutting and delivering silage from a stack includes a cutting unit incorporating a feeding conveyor and which is capable of upward and downward movement through the stack whereby an open topped vertical gap is cut in the silage through which the unit moves downwardly whilst the silage is being simultaneously cut and removed from the stack and delivered by said conveyor.

---

This invention relates to apparatus for cutting and delivering silage and the like from stacks.

It is conventional practice to store silage in relatively large heaps or stacks and as a result difficulty is almost invariably experienced when it is desired to remove some or all of the silage from such a stack for use on a farm or the like.

The primary object of the present invention is to provide apparatus for readily cutting silage from a conventional stack in such a manner that it may be easily handled and delivered for example, on to a truck for transport.

The efficiency of the cutting mechanism employed is such that the possibility of the delivery of the cut silage being interrupted is either eliminated or reduced to a minimum.

The apparatus is of a portable nature which enables it to be readily moved from place to place and furthermore it is of relatively simple design and construction which is not liable to easily get out of order or require frequent maintenance.

Various novel constructional features of the invention will be more readily apparent from the following description of several practical embodiments.

Apparatus in accordance with the present invention includes apparatus for cutting and delivering silage and the like from a stack comprising a main frame having mounting means thereon and a cutting unit carried by said mounting means so as to project laterally in relation to said main frame which also carries elevating means for raising and lowering said cutting unit relative to the main frame, said cutting unit having longitudinal cutting means at least at one side thereof and transverse cutting means adjacent to the outer end of said unt, a feeding conveyor extending lengthwise of said cutting unit between the inner and outer ends thereof and means for actuating said longitudinal and transverse cutting means and the associated feeding conveyor in unison whereby when in use the cutting unit is operatively positioned over the top of a stack of silage and is adapted to cut an open topped vertical gap therein through which the cutting unit moves downwardly whilst the silage is being simultaneously cut and removed from the stack and delivered from the inner end of said feeding conveyor.

Figure 1:
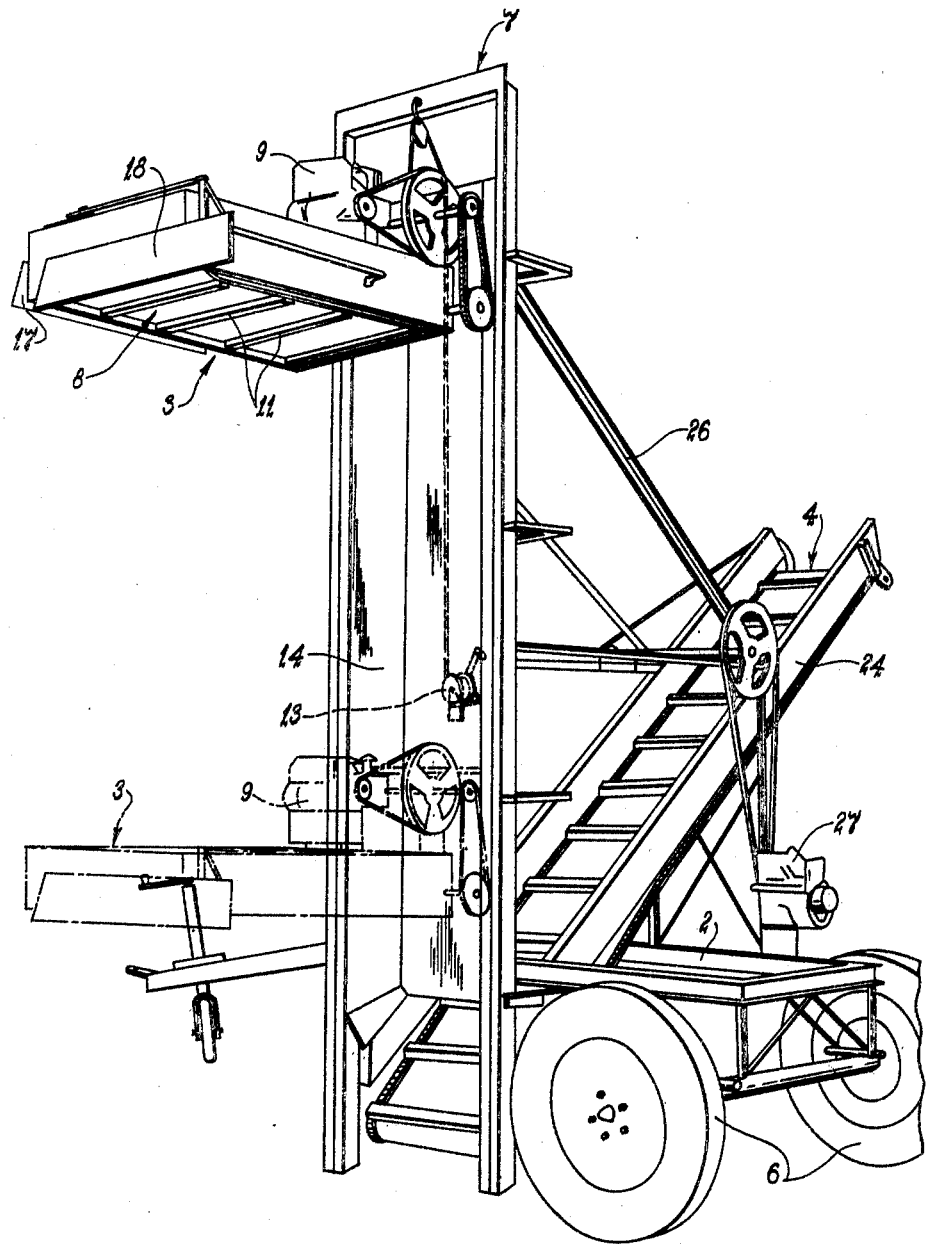
Figure 4:
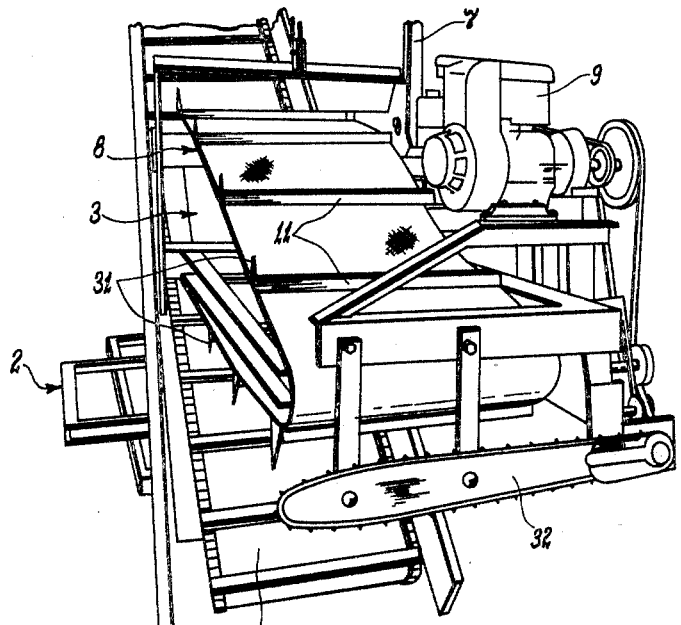
Figure 5:
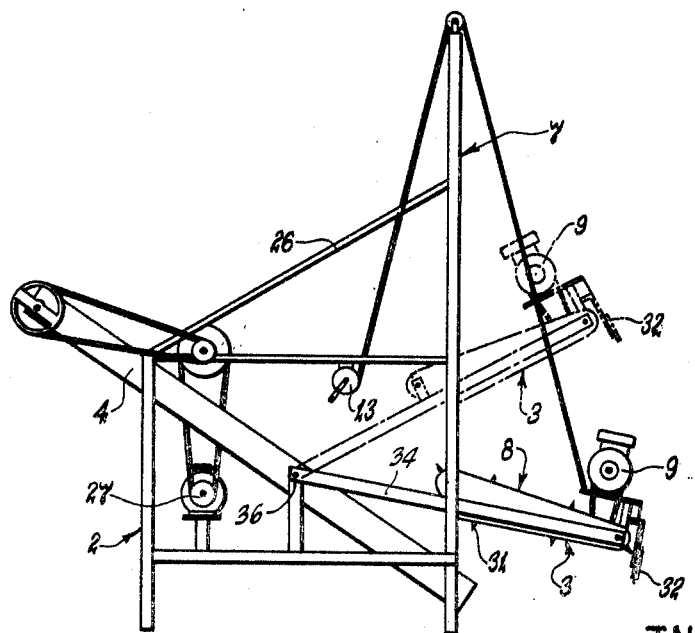

Referring to the drawings which form part of this specification:

FIGURE 1 is a perspective view of apparatus for cutting and delivering silage in accordance with one embodiment of the invention, FIGURE 2 is a perspective view on an enlarged scale of portion of FIGURE 1 showing the silage cutting means in its lowered position, FIGURE 3 is a perspective view of another and preferred embodiment of the invention, FIGURE 4 is a perspective view on an enlarged scale looking towards the front of the cutting means seen in FIGURE 3; and FIGURE 5 is a semi-diagrammatic side elevation of silage cutting means in accordance with a further embodiment of the invention.

The improved apparatus includes a main frame 2 carrying the supporting means for a cutting unit 3 which is movable downwardly and upwardly in relation to a stack of silage.

The cutting unit includes longitudinal and transverse cutting means as hereinafter described so that sections of silage may be cut from the stack, and also includes feeding means for delivering the cut silage for example either onto a transport vehicle or onto an elevator 4 for loading purposes.

The main frame 2 may be of any suitable formation and may be fitted with transport wheels 6 so that it may be moved lengthwise or crosswise in accordance with requirements. Alternatively, the frame may be provided with detachable connections so that it may be carried by the well known three point linkage which is commonly provided upon most tractors. Such linkage includes a pair of laterally spaced pivotal supporting means for connection to the apparatus to be carried and a hydraulically actuated lever arm located between the pivotal supporting means so that it may be connected by linkage to the associated apparatus and thereby raise and lower the latter as desired.

The silage cutting unit 3 is preferably mounted upon an upstanding guideway 7 on the main frame so as to extend crosswise of this guideway in such a manner that the forward end portion of the cutting unit overhangs the stack of silage when in use whilst the opposite or rear end portion of the cutting unit overlies the associated elevator 4 or if the latter is not employed the cutting unit may be adapted to feed the cut silage direct into a transport vehicle.

The cutting unit includes silage feeding means consisting of an endless conveyor 8 which extends lengthwise of the unit and is driven in any suitable manner by an adjacent power unit 9. For example this endless feeding conveyor may consist of a pair of spaced endless chains located adjacent to the opposite sides of the cutting unit and provided with a series of longitudinally spaced cleats or the like 11. An endless belt 12 of canvas or other suitable flexible material is preferably mounted beneath the cleats so as to minimise the possibility of the cut silage fouling any of the driving mechanism.

The silage cutting unit 3 may include a frame of substantially rectangular form in plan and which is provided at an intermediate point in its length with laterally spaced rollers for mounting in the upstanding guideway 7. A winch or any other suitable elevating means 13 is provided for raising and lowering the cutting unit along its guideway. If desired, the latter may have a chute, or the like 14 associated therewith for directing the cut silage onto the elevator 4 or another conveyor for delivering the silage to a transport truck or the like.

This chute however is not essential and may be entirely omitted if so desired. Alternatively, it may be of substantially right angled shape in cross section and be located at one side only of the aforesaid upstanding guideway.

In accordance with the embodiment illustrated in FIGURES 1 and 2 the main frame may include two substantially rectangular sections arranged in overlying relationship in somewhat cruciform shape. Each of the two sections may consist of opposite side and end frame members, the side members of the two sections being welded, bolted or otherwise secured together as aforesaid.

Mounting means are provided beneath each of the two sections of the main frame so that if a pair of transport wheels only is employed they may be detachably mounted upon either of the two sections so as to facilitate transport of the apparatus along a public roadway where clearance is limited or on farmland as required.

The aforesaid guideway 7 may consist of a pair of transversely spaced and opposed channel members 16 which are substantially parallel and extend upwardly in relation to the main frame.

The aforesaid cutting means in this embodiment consists of at least one reciprocatory knife 17 located at at least one side of the frame and a cross knife 18 extending transversely of the frame at the outer end thereof. Each of these knives may be connected to the supporting frame by pin and slot connections 19 or in any other suitable manner and be reciprocated by the power unit 9. This unit may consist of an internal combustion engine and the driving connections to the knives may consist of cam mechanism for driving the side knife or knives and pivoted linkage 21 connecting one of the side knives with the cross knife 18.

A bell-crank lever 22 or any other suitable operative connection may be employed for synchronizing the movements of the knives so as to avoid any possibility of undesirable contact therebetween.

The aforesaid elevator 4 may be adapted in this embodiment for transferring the cut silage from the bottom of the chute 14 up onto a truck or the like. This elevator is mounted in a supporting frame 24 which extends upwardly and sidewardly in relation to the bottom of the chute. The elevator supporting frame is maintained in the desired operative position in any suitable manner. For example, tie rods 26 may extend between the elevator frame and the upstanding guideway 7 or the elevator frame may be supported by struts upstanding from the main frame.

If desired any suitable means may be employed for varying the inclination of the elevator and in that case the elevator frame is necessarily pivotally mounted at or adjacent to its lower end.

The elevator may be of any suitable type such for example as a plurality of transversely spaced endless chains carrying cleats or any other suitable carriers for the cut silage. A separate power unit 27 such for example as an internal combustion engine is preferably provided on the main frame for operating the elevator.

In accordance with the preferred embodiment as illustrated in FIGURES 3 and 4 the aforesaid longitudinal and transverse cutting means includes a plurality of knives 31 carried by the cleats 11 at or adjacent to one or both ends thereof so as to project at substantially right angles to the cleats and thus cut downwardly into the stack of silage with a slashing action as the endless feeding conveyor 8 on the cutting unit moves downwardly and thence rearwardly through the top portion of the stack of silage.

Each of the cleats is also preferably provided with a series of upstanding spikes which cooperate with the cleats and function to effectively feed the cut silage from the stack.

The transverse cutting means may consist of an endless chain saw 32 which is preferably mounted upon the forward end of the frame of the cutting unit so as to extend transversely thereof beneath the path traversed by the knives 31 on the feeding conveyor.

The operative position of this chain saw is such that the transverse cut in the stack of silage is made in advance of the longitudinal cuts made by the series of knives 31.

Furthermore the length of the chain saw is such that it extends beyond the opposite sides of the feeding conveyor 8 and thus positively ensures that the silage being cut will be cleanly severed at the corners from the remainder of the stack.

In accordance with a further embodiment as illustrated in FIGURE 5 the silage cutting unit 3 is mounted upon a secondary supporting frame 34 which may be pivotally mounted as at 36 at or adjacent to one end thereof upon the main frame 2 or the frame of the associated elevator 4 if it is employed. In this case, the cutting unit 3 is located on its pivoted frame at or adjacent to that end thereof remote from its pivotal support so that the cutting unit may be swung downwardly and upwardly hrough the stack of silage.

In use the main frame 2 is mounted in the desired operative position in which the cutting unit 3 is located above the stack of silage. The longitudinal and transverse cutting means as well as the feeding conveyor 8 on the cutting unit are actuated whilst the unit is brought down into engagement with the top of the stack. As a result the chain saw 32 or other transverse cutting means cuts downwardly through the stack in advance of the knives 17 or 31 that are adapted to impart the longitudinal cuts in the stack whilst the cutting unit continues to move downwardly under the influence of its own weight and the cut silage is fed to the chute down which it drops on to the upper stretch of the elevator which thereupon carries it upwardly to an appropriate height for loading on to a truck.

The length of each of the knives 31 is such that the silage is cut for a distance considerably deeper than the height of the cleats 11 which function to pull the cut silage away from the main stack. Furthermore as the cuts made by the chain saw 32 and the cleat knives 31 overlap at the corners of the cut section of the silage, it will be appreciated that the silage is cleanly severed from the stack and there is no interruption to its subsequent feeding to the elevator 4.

As the rear end portion of the cutting unit overhangs this elevator, the cut silage is effectively delivered onto the elevator for subsequent discharge into a transport truck.

After each section has been cut from the stack it will of course be appreciated that the apparatus is moved bodily to one side so as to extend the original cut through the stack. Consequently if the first section is cut adjacent to one corner of the stack it is unnecessary for the knives 17 or 31 to be provided at both sides of the feeding conveyor 8 in that the desired object will be achieved if the knives are provided at one side only of the cutting unit.

It will be appreciated from the foregoing that when viewed from the side the length of the inclined elevator 4 plus the laterally projecting cutting unit 3 which extends in the opposite direction to the elevator, makes it difficult for the apparatus to be transported along a roadway in a direction transversely of the elevator. However the apparatus is relatively narrow in the direction lengthwise of the elevator when viewed in plan and this fact enables it to be readily moved in that direction along a roadway. It is for this reason that provision is made for mounting the transport wheels on either of two operative positions on the main frame so as to enable the apparatus to be readily transported when so desired along a roadway or laterally when it is desired to position the cutting unit above a stack of silage.

Instead of employing two separate power units 9 and 27 as aforesaid it will be appreciated that a single power unit mounted on the main frame or any other suitable location may be employed for actuating the elevator 4 as well as the mechanism on the cutting unit 3.

Alternatively operative driving connections may be provided for actuating the cutting means and the elevator from a power take off on a tractor or other motor vehicle.

Various other alterations, modifications and/or additions may be introduced into the foregoing construction and arrangement of parts without departing from the ambit of the invention, as defined by the appended claims.

Having now described my invention, what I claim as new and desire to secure by Letters Patent is:

1. Apparatus for cutting and delivering silage and the like from a stack comprising a main frame having mounting means thereon and a cutting unit carried by said mounting means so as to project laterally in relation to said main frame which also carries elevating means for raising and lowering said cutting unit relative to the main frame, said cutting unit having longitudinal cutting means at least at one side thereof and transverse cutting means adjacent to the outer end of said unit, a feeding conveyor extending lengthwise of said cutting unit between the inner and outer ends thereof and means for actuating said longitudinal and transverse cutting means and the associated feeding conveyor in unison whereby when in use the cutting unit is operatively positioned over the top of a stack of silage and is adapted to cut an open topped vertical gap therein through which the cutting unit moves downwardly whilst the silage is being simultaneously cut and removed from the stack and delivered from the inner end of said feeding conveyor.

2. Apparatus according to claim 1 wherein said mounting means includes an upstanding guideway through which said cutting unit extends in opposite directions so that the outer end portion of the cutting unit may overhang a stack of silage whilst the inner end portion of the cutting unit extends over said main frame.

3. Apparatus according to claim 1 wherein said mounting means includes a secondary frame pivotally mounted adjacent to its inner end upon a fixed support, said cutting unit being mounted upon said secondary frame adjacent to the outer end thereof.

4. Apparatus according to claim 1 wherein said mounting means includes transversely spaced and opposed channel members which are substantially parallel and form an upstanding guideway adapted to accommodate rollers on the opposite sides of said cutting unit.

5. Apparatus according to claim 1 wherein said feeding conveyor includes a series of longitudinally spaced cleats extending transversely thereof and said longitudinal cutting means consists of a series of said knives mounted on said cleats adjacent to at least one side of the feeding conveyor so that each knife extends laterally in relation to its cleat, said transverse cutting means being located beneath the path traversed by said longitudinal cutting means whereby a transverse cut is initially made in the stack of silage prior to the formation of the longitudinal cut which is adapted to intersect said transverse cut.

6. Apparatus according to claim 5 wherein said transverse cutting means consists of a chain saw the length of which is greater than the width of said feeding conveyor so that the transverse cut made in the stack of silage will be intersected by the longitudinal cut made by said longitudinal cutting means and thus ensure that the silage is effectively severed from the stack at the relevant corner of the open topped gap being formed therein.

7. Apparatus according to claim 1 wherein said longitudinal and transverse cutting means consists of reciprocatory knives mounted upon said cutting unit and operative driving connections for reciprocating said knives and synchronising their movements so as to avoid undesirable fouling.

8. Apparatus according to claim 1 in combination with an upstanding chute or baffle carried by the main frame and located adjacent to the inner end of said cutting unit so as to direct cut silage downwardly as it is delivered from the inner end of said feeding conveyor.

9. Apparatus according to claim 1 in combination with an elevator carried by said main frame and extending upwardly and outwardly in relation thereto, the lower inner end portion of said elevator being located beneath the inner end portion of said cutting unit so as to receive cut silage therefrom and discharge it into a transport vehicle or storage receptacle.

References Cited

UNITED STATES PATENTS

| | | | |
|---|---|---|---|
| 2,565,168 | 8/1951 | Christoffersen | 146—70 |
| 3,208,491 | 9/1965 | Bliss | 146—70.1 |
| 3,385,336 | 5/1968 | Barnard | 146—70.1 X |

W. GRAYDON ABERCROMBIE, Primary Examiner